United States Patent [19]

Virgille et al.

[11] Patent Number: 4,588,426
[45] Date of Patent: May 13, 1986

[54] AIR FILTER FOR INTERNAL COMBUSTION ENGINE

[75] Inventors: Jacques Virgille, Seloncourt; Francois Jodry, Herimoncourt; Antoine Juglair, Valentigney, all of France

[73] Assignee: Aciers et Outillage Peugeot, Audincourt, France

[21] Appl. No.: 616,749

[22] Filed: Jun. 4, 1984

[30] Foreign Application Priority Data

Jun. 2, 1983 [FR] France ................ 83 09195

[51] Int. Cl.⁴ ............................... B01D 50/00
[52] U.S. Cl. ................................ 55/337; 55/492; 55/498; 55/499; 55/501; 55/503; 55/510
[58] Field of Search ............... 55/498, 510, 492, 499, 55/501, 503, 506, 337

[56] References Cited

U.S. PATENT DOCUMENTS

| | | | |
|---|---|---|---|
| 2,699,928 | 1/1955 | Mayer et al. | 55/510 X |
| 3,160,488 | 12/1964 | Wilber | 55/501 |
| 3,209,520 | 10/1965 | McKinlay | 55/498 X |
| 3,339,533 | 9/1967 | Nordstrom | 55/337 X |
| 3,421,294 | 1/1969 | Sherburn | 55/337 X |
| 3,570,223 | 3/1971 | Svoren | 55/510 |
| 3,681,898 | 8/1972 | Hopkins et al. | 55/498 X |
| 3,796,416 | 3/1974 | Knudson | 55/498 X |
| 3,867,105 | 2/1975 | Wagner | 55/501 X |
| 4,062,781 | 12/1977 | Strauss et al. | 55/498 X |
| 4,063,913 | 12/1977 | Kippel et al. | 55/510 X |
| 4,130,405 | 12/1978 | Akado et al. | 55/510 X |
| 4,312,651 | 1/1982 | Esaki et al. | 55/503 X |

FOREIGN PATENT DOCUMENTS

| | | | |
|---|---|---|---|
| 2739290 | 3/1978 | Fed. Rep. of Germany | 55/503 |
| 607611 | 8/1960 | Italy | 55/510 |
| 894235 | 4/1962 | United Kingdom | 55/510 |
| 1454543 | 11/1976 | United Kingdom | 55/498 |
| 2075364 | 11/1981 | United Kingdom | 55/498 |

Primary Examiner—Kathleen J. Prunner
Attorney, Agent, or Firm—Sughrue, Mion, Zinn, Macpeak and Seas

[57] ABSTRACT

An air filter for a motor vehicle includes a filter body (1) closed by a cover (10). Extending from the bottom of the body are rods (8) for supporting a filtering cartridge (9) made from a flexible material, such as plastics foam. These rods are moulded in one piece with the filter body and they are arranged around the outlet opening (4) of the filter. The filter body is easily stripped from the mould and the supporting rods for the cartridge cannot be lost.

7 Claims, 5 Drawing Figures

AIR FILTER FOR INTERNAL COMBUSTION ENGINE

BACKGROUND OF THE INVENTION

The present invention relates to filters for treating a gaseous flow, and more particularly air filters for internal combustion engines.

Air filters known in the motor industry, in particular, usually comprises a case defining a filtering chamber with openings, one of which is the inlet whereas the other is the outlet, these openings communicating with each other through a filter cartridge of a flexible material, this filter further comprising means for supporting said cartridge so that the latter preserves the integrity of its shape. In most cases, the means for supporting the filter cartridge, which may be of an open-cell polyurethane foam, are formed by an independent grate of metal or plastics material which supports the cartridge so as to avoid deformation thereof in the course of operation of the filter. It is known that rather severe stresses are applied to these cartridges if they are employed in air filters for internal combustion engines owing, in particular, to the rather violent fluctuations in the flow of air fed to such an engine. Means for supporting the cartridge are consequently essential.

Now, apart from the fact of being capable of being lost, the presently employed grates of plastics material have the drawback of not lending themselves well to moulding, since there are required in the mould as many retractable cores as there are apertures in the grates, it being understood that the latter has a generally cylindrical shape.

SUMMARY OF THE INVENTION

The main object of the invention is to avoid these drawbacks in the prior art, and to provide a filter in which the supporting means cannot be lost and are easily mouldable.

The invention therefore provides a filter of the general type mentioned hereinbefore, wherein said supporting means comprise a series of parallel rods against which said cartridge is maintained, and which are integral or in one piece with said case.

Such a filter may be easily stripped from the mould owing to the shape and disposition of the supporting rods, which, as they are in one piece with the body of the filter, cannot be lost.

BRIEF DESCRIPTION OF THE DRAWING

A better understanding of the present invention will be had from the following description of an embodiment with reference to the accompanying drawings which are given solely by way of example and in which.

DETAILED DESCRIPTION OF THE PREFERRED EMBODIMENT

Figure 1:
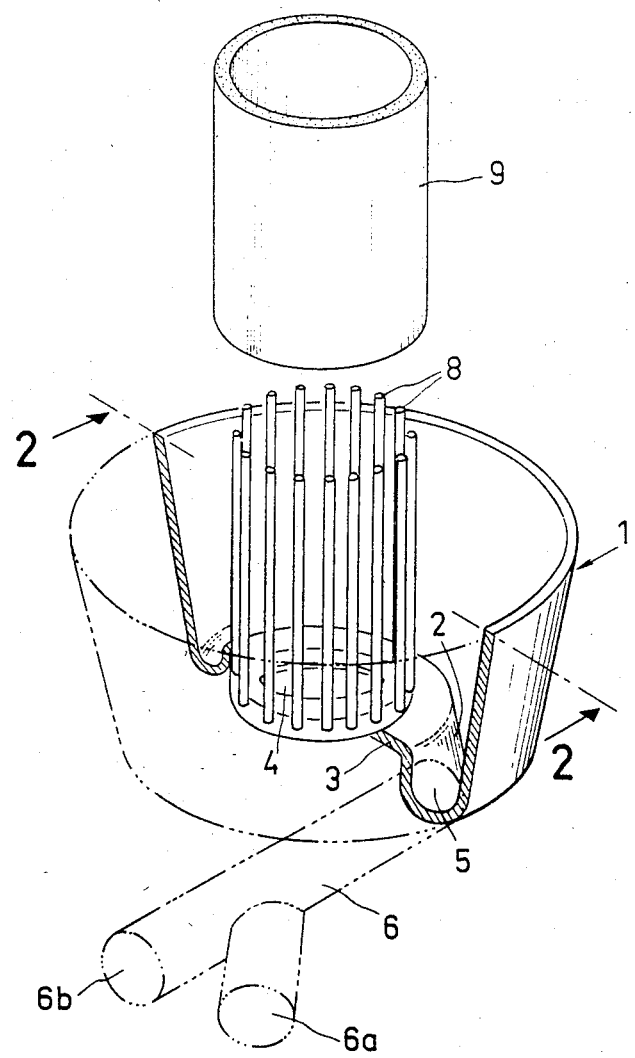
FIG. 1 is a partial sectional view of a filter according to the invention, from which the cover has been removed, a filter cartridge being shown just before it is placed in position.
Figure 2:
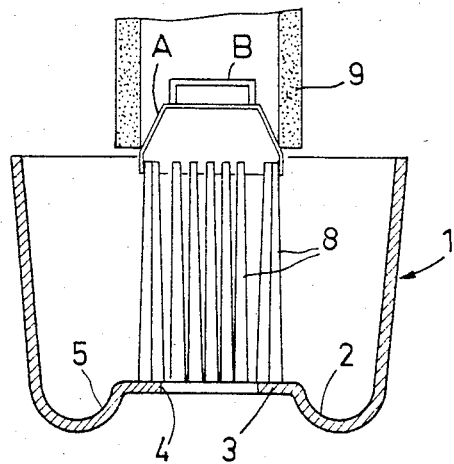
FIG. 2 is an elevational and axial sectional view taken on line 2—2 of FIG. 1.

In the embodiment shown in the drawings, the filter is adapted to be employed as an air filter of an internal combustion engine.

It comprises a body 1 whose shape is similar to a cup having a slightly divergent wall. The bottom 2 of this cup has a raised central portion 3 provided with a circular opening 4 for the access of air, and this raised portion is surrounded by an annular groove 5 to which is tangentially connected an air inlet pipe 6. This pipe terminates at its free end in two end elements 6a and 6b, namely one for the inlet of hot air and the other for the inlet of cold air, a thermostat flap 7 (FIG. 3), known per se, being provided, if desired, for regulating the temperature of the air flowing in the filter. Provided around the circumference of the opening 4, is a series of supporting rods 8 which extend parallel to one another and to the axis of the filter body 1, from the raised portion 3. Each rod has a slightly conical shape and a circular section. However, any other suitable shape may be employed. The rods 8 are adapted to support a filter cartridge 9 of open-cell polyurethane foam, for example, or of polypropylene. The number of supporting rods is so chosen that the filter cartridge preserves the integrity of its shape under all conditions of circulation of the air in the filter.

Figure 4:
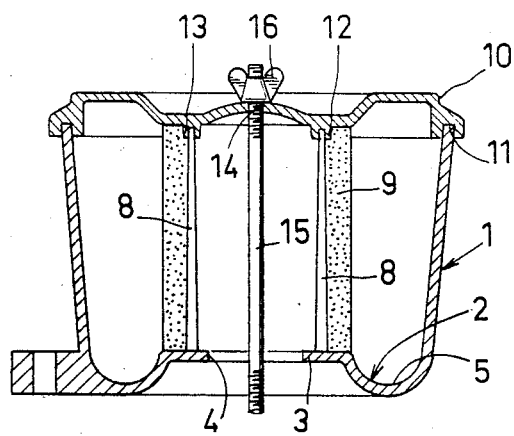
FIG. 4 is an elevational and sectional view of the air filter according to the invention.

FIG. 4 shows that the filter according to the invention further comprises a cover 10 which has a peripheral groove 11 which is adapted to the edge of the lateral wall of the cup 1, a coaxial annular rib 12 provided with an annular groove 13 and a central aperture 14. The latter is adapted to receive a screwthreaded rod 15 which extends through the body 1 and is fixed in the known manner in a carburettor (not shown) which the air filter caps.

The annular groove 13, which has the same diameter as the pitch circle along which the supporting rods 8 are disposed, is adapted to receive the free ends of these rods when the cover 10 is placed in position on the filter body 1.

This cover is maintained in position by a wing nut 16. Note that the length of the filter cartridge is preferably chosen to be a little greater than the distance between the cover and the raised portion 3 of the bottom 2 so as to avoid any accidental flow at the ends of the cartridge.

Advantageously, the filter body 1 and the ring arrangement of supporting rods 8 are moulded together, preferably from a suitable plastics material. The cover may be made from the same material. Further, the shape of the filter body and of the rods is such that their stripping from the mould is facilitated, the rods being used, if desired, for ejecting the body out of the mould. Further, the supporting rods improve the passage of the air by decreasing the pressure drops since they reduce to a minimum the area opposing the circulation of the air, as compared to the conventional grates employed in the prior art.

Figure 3:
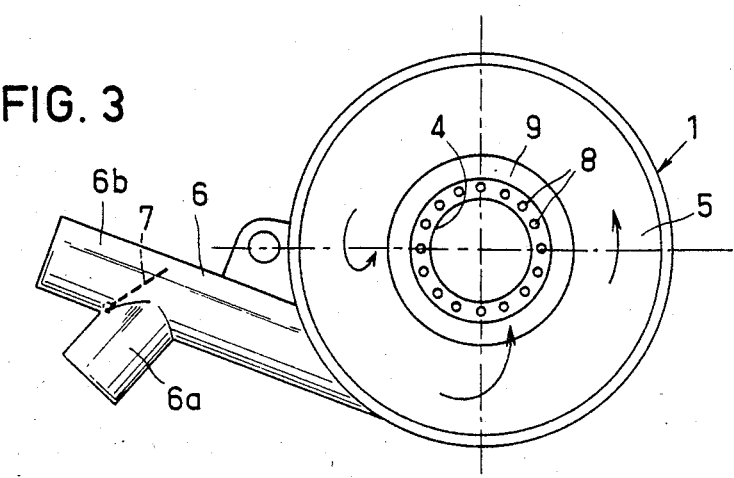
FIG. 3 is a plan view of the air filter before the assembly of the cover.

FIG. 3 shows, by means of the arrows, the circulation of the air in the filter body. However, this circulation of air may be reversed or, in other words, it may pass through the filter cartridge in the opposite direction, if the placement of the filter close to the heat exchanger requires this. In this case, the pipe 6 of course does not include a thermostatic mixture device.

FIG. 6 shows how the filtering cartridge may be suitably placed on the series of supporting rods. For this purpose, a tool A in the shape of a cup whose opening diameter is equal to the diameter of the enveloping surface of the ring arrangement of rods, is placed in an inverted position on the latter, so that it is possible to slide the cartridge on the rods. The tool preferably includes a handle B. It may be used either when initially assembling the filter, or by the garage mechanic, when replacing the cartridge. In this respect, note that this replacement only involves the positioning of the cartridge in contrast to the prior art, in which the dismantling of the cartridge requires that of the supporting grate, whence risk of omission or loss of the grate when re-assembling the filter.

Figure 5:
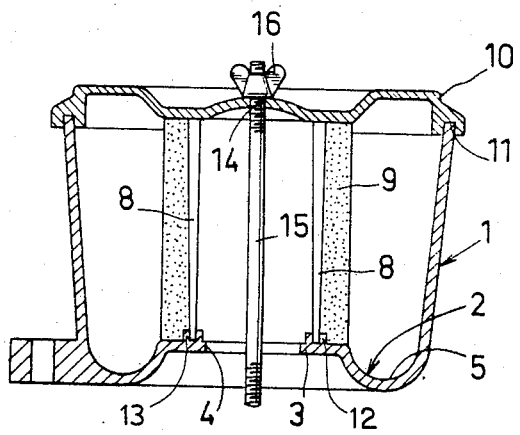
FIG. 5 is an elevational and sectional view of the air filter according to a second embodiment of the invention.

According to a modification which has been shown in FIG. 5 of the drawings, the supporting rods may be in one piece with the cover, instead of being moulded with the filter body.

What is claimed is:

1. A filter for filtering combustion air of an internal combustion engine, said filter comprising a case having a generally cup-shaped body (1) with a base and a wall extending from said base, and a cover (10) which caps said body, said base having a raised portion (3) surrounded by an annular groove (5) and a pipe (6) which constitutes an inlet opening of the filter, said pipe opening onto said annular groove tangentially of said annular groove, said case defining a filtering chamber provided with openings including the inlet opening (6) and an outlet opening (4) arranged coaxially in the base, a generally cylindrically shaped filter cartridge (9) with open opposite ends and of a flexible material through which cartridge said openings communicate with each other, and means for supporting said cartridge so that it preserves the integrity of its shape, said supporting means comprising a ring arrangement of a series of parallel rods (8) with respect to which rods said cartridge is supported, said rods being disposed about a circle extending around the outlet opening of the case said circle being coaxial with said outlet opening, said rods being integrally moulded with said case, said rods being free relative to each other at one end thereof.

2. A filter according to claim 1, wherein each rod is integral with said case at an end of the rod.

3. A filter according to claim 1, wherein the free end of each rod is remote from an end by which the rods are integral with said case and a cross-section of each rod is rounded and has an area which decreases in a direction from the end which is integral with the case to said free end thereof.

4. A filter according to claim 1, wherein said series of rods are integral with said cup shaped body.

5. A filter according to claim 4, wherein the inner surface of said cover has an annular rib (12) in which is formed an annular groove means (13) for receiving the free ends of said rods when the cover is placed in position on said body.

6. A filter according to claim 1, wherein said series of rods are integral with the cover.

7. A filter according to claim 6, wherein said base has an annular rib formed around the outlet opening and in which is formed an annular groove means for receiving the free ends of said rods when the cover is placed in position on said body.

* * * * *